United States Patent
Argyle et al.

(10) Patent No.: US 6,672,739 B1
(45) Date of Patent: Jan. 6, 2004

(54) LASER BEAM HOMOGENIZER

(75) Inventors: Bernell Edwin Argyle, Hopewell Junction, NY (US); Jeffery Gregory McCord, San Jose, CA (US)

(73) Assignee: International Business Machines Corp., Armonk, NY (US)

(*) Notice: Subject to any disclaimer, the term of this patent is extended or adjusted under 35 U.S.C. 154(b) by 0 days.

(21) Appl. No.: 09/386,017

(22) Filed: Aug. 30, 1999

(51) Int. Cl.[7] .............................................. F21K 27/06

(52) U.S. Cl. .......................... 362/259; 362/553; 372/9; 385/28; 385/901

(58) Field of Search ............................. 385/15, 27, 28, 385/29, 31, 32, 39, 133, 901, 147; 362/553, 259; 372/9, 12–15

(56) References Cited

U.S. PATENT DOCUMENTS

| 4,744,615 A | * 5/1988 | Fan et al. ............... 219/121.61 |
| 5,634,920 A | * 6/1997 | Hohla .......................... 606/12 |
| 5,889,278 A | * 3/1999 | Richard ................... 250/214 R |

OTHER PUBLICATIONS

B. E. Argyle, D. A. Herman, and B. Petek; Reduction of coherence-related noise in laser based imaging systems IBM Technical Disclosure Bulletin vol. 37 (12), 469–471 (1994).

H. J. Gerritsen, W. J. Hannon, and E. G. Ramberg; Elimination of speckle noise in holograms with redundancy Applied Optics vol 7 (11), 2301–2311, (1968).

Gordon W. Ellis; Fiber-optic phase randomizer fro microscope illumination by laser J. Cell. Biology vol 83, p303 , (1979).

Robert Hard, Robert Zeh, and Robert D. Allen; Phase randomized laser illumination for microscopy , J. Cell Sci. 23, 335–343 (1977).

S. K. Dey, M. J. Bowman, and A. D. Booth; A new technique for improving domain pictures in Kerr-effect microscopy using a laser source; J. Scientific Instr. (J. Physics E) vol 2, 162–164 (1969).

Malcolm J. Bowman; Two new methods f improving optical image quality; Appl. Optics vol. 7 2280–2284 (1968).

* cited by examiner

*Primary Examiner*—Sandra O'Shea
*Assistant Examiner*—John Anthony Ward
(74) *Attorney, Agent, or Firm*—Rodney T. Hodgson

(57) ABSTRACT

An apparatus, system, and method for illuminating a lithographic mask or an object in a microscope is presented, whereby the output of a laser beam homogenizer is imaged on to a field such as the object plane for lithographic application or on to the rear focal plane of an epi illuminating objective lens as a source for wide field illumination at an object plane in a microscope (for application to magnified imaging of weak phase objects)., and the image of the output is dithered with respect to the field

40 Claims, 7 Drawing Sheets

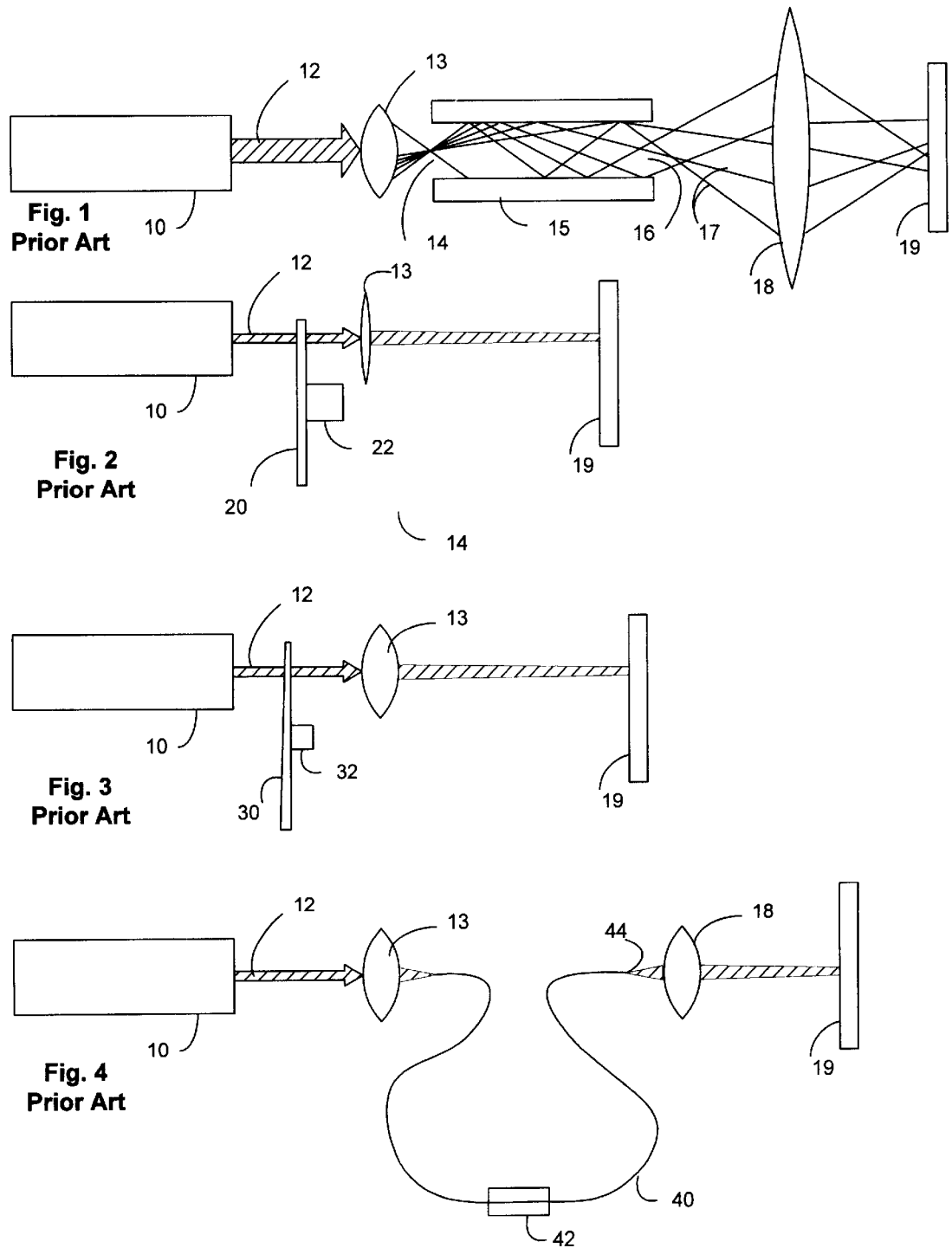

LASER BEAM HOMOGENIZER

FIELD OF THE INVENTION

The field of the invention is the field of apparatus for homogenizing laser light for illumination of objects in microscopes and in photolithographic applications.

BACKGROUND OF THE INVENTION

Lasers may be used as illumination sources for microscopes and for photolithographic systems. Laser beams are typically single mode beams or multimode beams, and the beam homogeneity and coherence properties of such beams may not be sufficient for the application. For single mode laser beams, the light distribution is Gaussian in a line taken perpendicular to the beam. For uniform illumination, the "top" of the beam may be used, but much of the light intensity is then thrown away. Multimode beams may have a "top hat" distribution, but unless all modes have nearly equal population, the intensity may vary over the "top hat". In applications where intense laser light exposes highly non-linear photoresists, for example, to produce highest resolution exposure in photoresist, a few percent variation in light intensity may be sufficient to degrade the system capability. For microscopic investigations of weak phase objects, such variation may also lead to masking of the small difference in reflected light from neighboring objects, and to introduction of artifacts related to the coherence of light reflected from different parts of the objects in the field of view.

An excellent overview of microscope illuminators is included in S. Inoue, Video Microscopy, Plenum Press, New York, N.Y., 1986.

Prior art systems have used systems of diffusers in the laser beam path to homogenize the beam. Prior art systems such as outlined in an abstract by G. W. Ellis, "A Fiber-Optic Phase-Randomizer for Microscope Illumination by Laser". J. Cell Biol. 83, 303a (1979), have used optical fibers as beam homogenizers to convert near single mode laser beams to multimode beams for illumination systems in microscopes. Prior art systems have used light tunnels, as in U.S. Pat. No. 4,744,615, and systems of lenses, as in U.S. Pat. No. 4,475,027, and holographs, as in U.S. Pat. No. 5,610,733, to homogenize laser beams. The output of such beam homogenizers is often insufficient for exacting lithographic and microscopic work, especially on a small scale. Prior art systems R. D. Allen, "Phase-Randomized Laser Illumination for Microscopy", J. Cell Sci. 23, 335 (1977), have used rotating wedges in combination with a diffuser in a laser beam to move the laser beam around on the object being illuminated. Such rotating wedges average out small scale inhomegenuities in the laser beam, but leave large scale inhomogenuities in place.

OBJECTS OF THE INVENTION

It is an object of the invention to produce an apparatus, system, and method for illuminating an object or mask uniformly over a certain area.

It is an object of the invention to produce an apparatus, system, and method for illuminating weak phase object in a microscope with high efficiency.

It is an object of the invention to produce an apparatus, system, and method for illuminating an object or mask uniformly over a certain area with high efficiency, and to record dynamic effects with improved spacial and temporal resolution and contrast.

SUMMARY OF THE INVENTION

The present invention is a system, apparatus and method for uniformly illuminating a field, (such as an object in an object plane or the rear focal plane of an epi illuminating objective lens) by imaging the output aperture of a laser or other light beam homogenizer on the field using an apparatus which dithers the image of the output of the beam homogenizer with respect to the field perpendicularly to the optical axis or dithers the output of the beam homogenizer so that the image of the beam homogenizer dithers with respect to the object or the rear focal plane. The dither means, in a preferred embodiment, is synchronized with dynamic effects in the object or with a video recording device to provide enhanced resolution.

BRIEF DESCRIPTION OF THE DRAWINGS

FIG. 1 shows a prior art system of a laser beam homogenizer.

FIG. 2 shows a prior art system for homogenizing a laser beam.

FIG. 3 shows a prior art system.

FIG. 4 shows a prior art system.

DETAILED DESCRIPTION OF THE INVENTION

Figure 5:
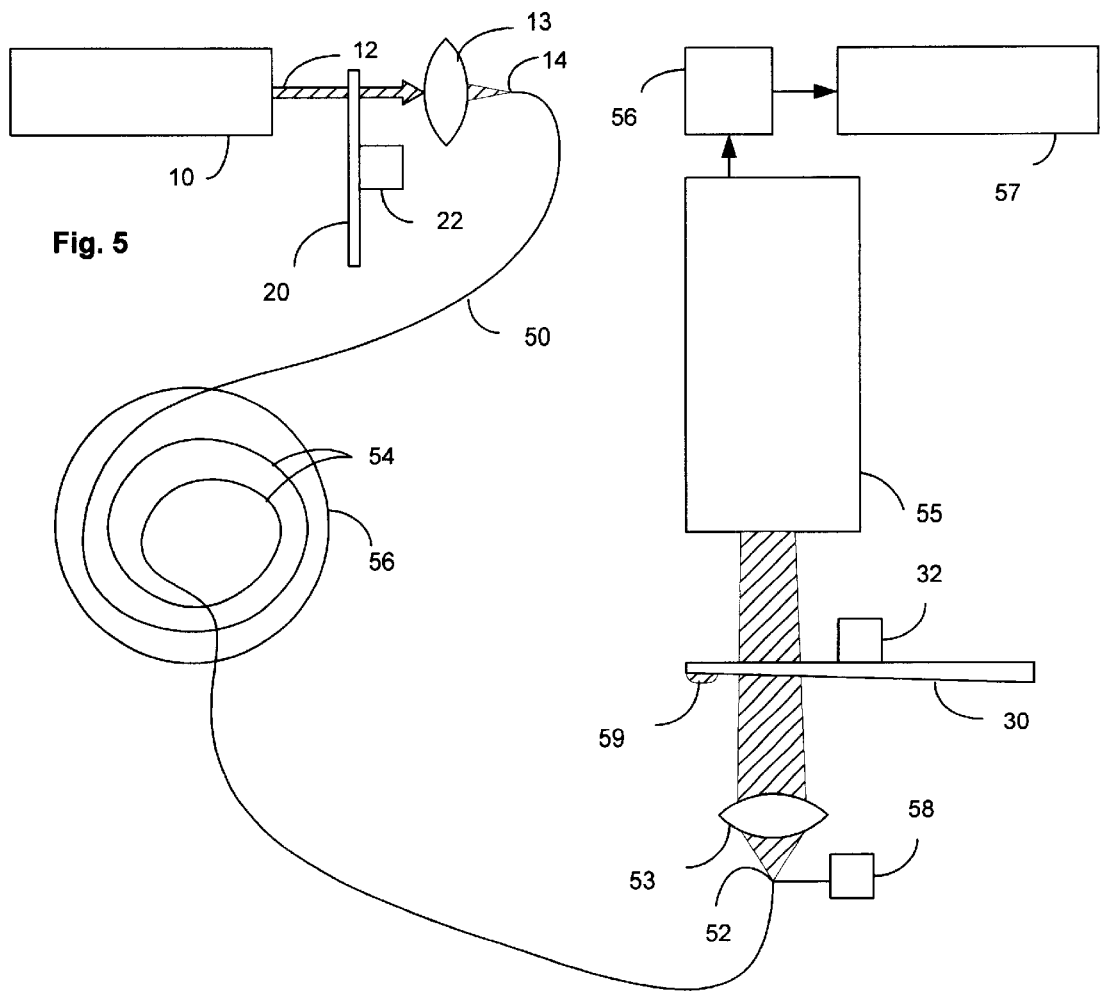
FIG. 5 shows a sketch of the system of the invention.

FIG. 1 shows a prior art system such as described in detail in U.S. Pat. No. 4,744,615, whereby a laser 10 produces a laser beam 12 which passes through an optical system 13 (here denoted as a simple lens) into the entrance aperture 14 of a laser beam homogenizer 15. The laser beam homogenizer may be constructed from four reflecting plates (only two shown in the elevation view of FIG. 1) arranged in the form of a square or rectangular tube. A number of light rays 16 are shown as a guide to the eye. The exit aperture 17 of the beam homogenizer 15 is imaged by an optical system 18 (here denoted by a symbol for a lens)on to an object 19. In a prior art case, object 19 may be a mask which has apertures for some of the light rays 16 to pass which may be further focused by another optical system (not shown) on to a work piece (not shown). The laser beam homogenizer system as shown passes light from the laser 10 which has not reflected from the plates of the laser beam homogenizer 15 and produces an inverted image of the exit aperture 16 on the object 19. Light which has bounced multiple times from the top, bottom, and side plates of beam homogenizer plates 15 also form such images on object 19. The light from each multiple bounce comes from a different region of laser beam 12, and hence non uniformities on laser beam twelve are averaged out by the multiple overlapping images. The angle of the light rays 16 striking the object may be controlled by the focusing action of the optical system 13 and the number of bounces the light rays 16 make on the plates of the beam homogenizer 15. The uniform illumination of the object 19, and the controlled angle which the light rays which exit a mask are important in use of the mask and laser system in lithography and in laser ablation of material. Residual inhomogenuities in the irradiation of the object 19 are, however, still a problem.

FIG. 2 shows a prior art system for homogenizing a laser beam. A rotating diffuser plate 20 is rotated by a motor 22 to homogenize the output beam 24 so that the image of the diffuser plate 20 may be formed on an object 19. The setup sketched in FIG. 2 is advantageously used in a microscope illumination system. Unfortunately, a laser such as an argon ion laser used in a setup such as shown in FIG. 2 produces a beam having coherent properties which lead to a residual speckle pattern when the object 19 is an object illuminated in the microscope system. The spot of light produced on the object 19 has the time averaged intensity of the spot of light formed on the diffuser plate 20, which is typically a Gaussian beam, and the illumination is non-uniform over the field of illumination.

FIG. 3 shows a prior art system where a rotating wedge 30 is used to rotate a spot of light from the laser beam on the object 19. Depending on the wedge angle of the wedge 30, the image of the laser beam rotates about a point with greater or lesser amplitude. In essence, each point of the image of the beam on the object 19 rotates about the point where it would be imaged if there were no wedge.

FIG. 4 shows a prior art system whereby a laser beam passes through a beam homogenizer, in this case an optical fiber 40, and the optical fiber is vibrated by a piezo electric crystal 42 to change the mode propagation patterns in the fiber, and hence change the speckle pattern formed by the light from the exit face 44 of the fiber when the exit face 44 of the fiber is imaged on the object 19. Such a system still has a residual effect due to incomplete homogenization and incomplete averaging of the light over the exit face 44 of the fiber.

FIG. 5 shows a sketch of the system of the invention used for a microscope illuminator. An optical fiber 50 with other components described below is used as a beam homogenizer to homogenize a laser beam 12. The exit face 52 of the fiber provides illumination to the object using an optical system comprising a collimating lens means 53, a rotating wedge 30, and the optical system of a microscope 55. A camera 56 and a recording device 57 record images of the illuminated object in a preferred embodiment. A means 58 for dithering the exit face 52 perpendicular to the optical axis is shown. Such a means 58 may be a simple mechanical means, or the means may be an acousto optic, magneto optic, electrooptic, or other means as known in the art for modifying the propagation of light. The invention may be used as shown with a microscope, where the light from the exit face of the fiber is first imaged in a field on the rear focal plane (RFP) of the microscope, and then conducted by the optical system of the microscope to uniformly illuminate the object plane of the microscope, or may be used to image the fiber face on and illuminate a mask or other object directly without passing through an intermediate image forming stage.

Figure 14:
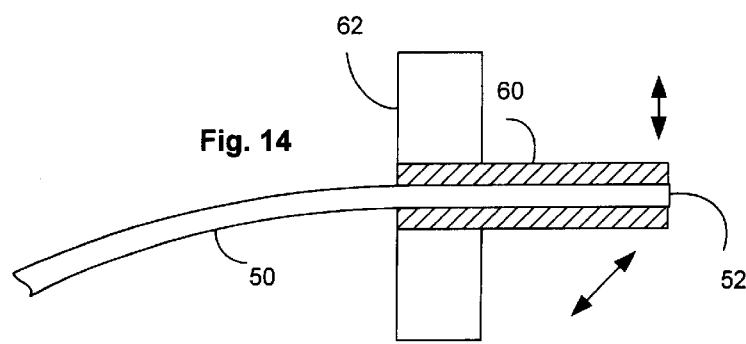
FIG. 14 is a sketch of a hollow piezoelectric tube holding an optical fiber.

FIG. 14 is a sketch of a hollow piezoelectric tube 60 holding an optical fiber 50. One end of the piezo tube 60 is held rigidly in a holder 62. The piezoelectric tube 60 may have one grounded electrode (not shown) inside the tube, and four electrode (not shown) in stripes longitudinally along the sides of the tube. Application of voltages to the various electrodes will cause the hollow tube to bend and move the optical fiber exit face 52 in horizontal and vertical directions as shown by the arrows in FIG. 14.

Microscopic objects can often be categorized as amplitude objects or phase objects in so far as the interaction of light with the object produces changes in light amplitude or phase, respectively. To render an image of a phase object on photographic film or video screen requires conversion from a phase distribution to an amplitude distribution. This is typically accomplished using polarized light for illumination and by introducing optical phase-analyzing elements in the viewing path such as an optical analyzer and compensator. When these elements are adjusted to produce phase-to-amplitude conversion, most of the light incident on the object is discarded. The residual light that remains in the viewing path carries the spatial information of interest for studies of the phase object. When conventional illumination is used, the images formed in a high power microscope are typically so weak as to be undetectable with even the sensitive dark-adapted eye. We say that such a weak-contrast image comes from a "weak phase object", or WPO.

To render images of WPOs places great demands on the microscope, the photometric sensing, and signal processing. Special digital signal processing methods have been developed to enhance image contrast for video microscopy. The Hamamatsu C1966 image processor that was developed by microbiologists at the Woods Hole Oceanographic Institute is one example. Imaging cards installed in the personal computer can also process weak video signals. Processing consumes time. The problem to be solved is to overcome processing limitations and low throughput.

The approach of the invention sketched in FIG. 5 is to greatly enhance the strength of the microscope's incident wide field illumination to well above what is normally available from conventional sources. Specific means are described to inject high intensity laser illumination into the microscope to replace the less intense, unsteady, incoherent arc illumination and overcome the problem of image noise associated with laser coherence. This method thereby greatly enhances the contrast and the effective optical resolution of processed images; it enhances the optical limit of perception.

Earlier methods using laser light to enhance wide-field illumination intensities have been found to introduce image artifacts unrelated to the nature of the WPO: image noise and non-uniformity.

The method proposed and demonstrated here uses a laser light stream in combination with a multi-mode fiber or other laser beam homogenizer together with a means to homogenize the spatial variations of illumination intensity at the object caused by localized ray bundles emanating from different fiber modes.

The reduction-to-practice of the present invention is demonstrated by forming high magnification wide-field images of laser-illuminated magnetic recording head devices and comparing them quantitatively with images formed using a conventional 100 W mercury arc-lamp supplied within the same microscope. The 100 W Hg-arc is considered the most intense incoherent source available for visible light microscopy. We show that (1) image artifacts due to laser coherence and fiber modes are minimal, (2) dynamic range is increased, (3) image S/N ratio is increased, (4) 'effective' optical resolution is improved, and (5) efficiency of thoughput is improved with diminished time consumed by multiple steps of image processing (image accumulation, averaging and subtraction). Also, synchronizing the mode scrambler and dithering means to an integer of the video frame rate permits the advantage (6) that WPO motions may be recorded in real time (at video rates). This benefits video recording not only device responses (for example, motions of magnetization inside recording heads being stimulated with applied electrical currents), but also micro biological cell motions, for example in a squid neural axons responding to the firing of a synapse.

Potential Application and Implementation

The significance to overcoming inadequacies of prior-art microscope sources (insufficient arc intensity and stability, and artifacts of laser coherence), is the improvement in capability to image a large class of WPOs that are of current technological or biological importance.

Examples of important WPOs are:
(1) micro biological cells suspended in an optically isotropic liquid (visible due to the cell's optical birefringence);
(2) defects producing hot spots in integrated circuits carrying electrical current (visible due to thermal stress-induced birefringence in a polymer film overcoat[13]);
(3) magnetic responses and/or defects in magnetic devices such as recording heads (visible due to Kerr- or Faraday magneto-optic effects intrinsic to the constituent magnetic materials), and
(4) exposed pattern in photolithgraphic film (made visible as due to small index of refraction difference from non-exposed region).

These are just four of many WPOs capable of being magnified and viewed with polarized light microscopy. Magnetic materials subdivide into 3 optical groups: highly reflecting, transparent, and absorbing (non-reflective). Iron-based ferrites for example, span a range from being transparent through opaque (black) due mostly to interaction of iron-oxide with visible light.

An example of a strong phase object (SPO) would be materials used in liquid crystal personal computer displays and flat-panel monitors. Certain types of liquid crystals exhibit large circular birefringence, hence large angles of rotation for polarized incident light.

Polarized light microscopy of WPOs and SPOs can be of great benefit to diagnostics in manufacturing, defect monitoring, device developmental studies, studies on new thin film magnetoresistive (MR) materials for MR read heads, ferrite materials 3 for recording heads, and for fundamental investigations for better scientific understanding of properties of magnetic films/ materials/liquids, or stress-induced birefringent films/liquids/materials. Other means for their imaging, such as electron microscopy, atomic force microscopy and magnetic force microscopy, are more limited in their application. In practice unfortunately, these methods typically offer only a slightly improved spatial resolution at great sacrifice to throughput.

Different means are available to render amplitude images of WPOs in a polarizing microscope: one using wide-field illumination is based on video detection and image processing; another uses a spot focused illumination with spot photometric detection and mechanical scanning to render the images. The compatibility of wide-field illumination and video imaging makes this method more time-efficient because electron beams in the video camera scan much faster than mechanical methods scanning a sample under focused spot illumination. Wide-field illumination is also more consistent with procedures conventionally used in optical microscopy. Laser-spot focused imaging has until now produced images with the best signal-to-noise ratios by means of lock-in amplification and synchronous detection. However, wide-field video detection and processing can be used to capture both synchronous- and asynchronous time varying phenomenon for time rates of change slower than video frame rates. Responses at shorter times have been imaged with stroboscopic averaging using wide-field 10 ns pulsed laser illumination and sub 10th nanosecond focused laser illumination. The later is used currently for characterizing spatial and temporal responses inside DASD recording heads. Light intensity requirements for focused illumination are less severe than for wide-field illumination. However, lasers (CW or pulsed) available commercially can supply adequate power (1–4 W) for both. Microscopes such as the Zeiss Axiomat are capable of accepting these power levels without suffering damage to the optical elements, especially for wide-field illumination where the laser focus spot is in air behind the objective, not inside objective elements.

Another benefit of the convenience and information content made possible by wide-field image recording, is to facilitate pulsed-laser strobing of magnetic responses inside DASD recording heads. Strobing with sub-tenth-nanosecond time resolution can enable studies of magnetic instability known to be problem in making magnetoresistive (MR) heads. Motions of domain walls inside MR-head shields can be captured stroboscopically while recordings of the instability (changes in the MR transfer function) are recorded electronically. Knowledge of wall motion behavior in magnetic shields and how they correlate with instability in MR response should improve understanding the fundamental nature of the problem. The instability problem permeates a large segment of the magnetic storage industry, one that depends on stable MR read heads and inductive write heads. This problem is expected to worsen as DASD data rates increase.

Sensitivity and Degree of Difficulty

WPOs of importance to frontier studies in micro biology or technology exhibit phase shifts as small as a few tenthousandths of the wave length of light. Its origin in the case of magnetic phase images is magnetic circular- or elliptical birefringence. Circular birefringence causing the polar Kerr effect produces a rotation of the plane of polarization upon reflection from a material magnetized perpendicular to its surface. Components of magnetization parallel to the plane of the film produce the Longitudinal Kerr effect (elliptical birefringence). These effects can also be imaged with kerr microscopy[8]. The amount of rotation for NiFe alloys is very small-only of the order of ten milli-degrees[1] in Permalloy films thicker than the optical skin depth, $\delta$. Films thinner than $\delta$ yield smaller Kerr-signals. Thus, investigations of thin film permalloy deposited on glass or on transparent antiferromagnetic films used for biasing the MR element, will also benefit from the greater illumination intensity.

Non-magnetic rotations due to the microscope itself, can overwhelm small Kerr rotations. The ordinary Snell's law of refraction at spherical lens surfaces can cause rotation of the plane of polarized light. The effect is as large as 5 degrees in a 100X/1.3 NA objective lens. To remove this effect, the illuminating ray bundle must be injected into the lens along a plane defined by one of the great arcs on the lens surface and the light polarization must be parallel- or perpendicular to that plane[2].

Background light may be uniform or non-uniform, time dependent or constant. Uniform constant background can be eliminated by sequential digital image processing steps including analog-to-digital conversion, image summation, and background image subtraction. The time consumed by this process may exceed time constants of disturbances in the microscope system causing deterioration of the image. These disturbances may be caused by the illumination system producing changes in light amplitude or polarization, or by motions in a mechanical system too weak to prevent relative motions of microscope optics and object stage.

As mentioned above, the process of conversion from a phase object to amplitude image using nearly crossed polarizers (and, in some cases, an optical compensator[1-4]), will strongly reduce the light intensity at the camera. The intensity of an arc source reaching the video camera attached to the microscope is generally smaller than the threshold of camera response. This effect can severely limit the dynamic range and the signal-to-noise ratio.

Expansion of the dynamic range calls for increasing the light intensity at the detector. Light intensity at the camera is proportional to object illumination and to $\sin^2(\theta+/-\Delta)$, where $\theta$ is the angle the analyzer is offset from 90 degrees to the polarizer, and where $\Delta$ (put simply) is due to the object's phase distribution. Detector intensity may be increased by increasing $\theta$ However, the resulting increase in background intensity causes increased detector noise [4]. Issues as these become particularly acute when the microscope's optical magnification is increased, because intensity at the detector falls off inversely as the square of magnification for objects illuminated with transmitted light (Faraday contrast) and to the fourth power of magnification in reflection (Kerr contrast)[4]. This drop off severely limits both the magnification and the 'effective image resolution'.

To remove image distortion due to a non constant background intensity, digital image processing is used. It is used also to subtract background that arises from non-magnetic reflections or refractions in the microscope lenses, beam splitters, or other objects in the light stream, including the sample under inspection, its protective overcoat films, cover slips, etc. Non-uniform background is especially prominent when viewing WPOs in a reflection microscope where the illumination passes to the object through the objective lens. Phase changes at the beam splitter and lens surfaces produce non-uniform background affects due to optical interference and refraction, respectively. The refraction effect is particularly strong. It is due to Snell's law of refraction which dictates that a ray passing through a spherical refracting surface does not retain its incident phase unless both the incident and emergent rays lie in a plane common to an arc of the great circle[2]. (*Specialized optics with a meniscus lens designed to correct for this effect have been designed but are not available commercially. Each type of objective requires a different type of meniscus lens.) Non-uniform illumination may also arise due to dispersion in light polarizations within the ray bundle passing through the objective. This effect will distort the conversion from a phase distribution to an amplitude distribution. Uniformity may be nearly established however, when Koehler optics is utilized so as to sharply focus an image of the source onto the objective's rear focal plane (RFP) and the "point source" is positioned in one arm of the polarization extinction cross seen when the polarizers are crossed and the Bertrend lens is focused on the RFP. This position minimizes the dispersion in out-put polarizations of the objective due to the snell's law refraction effect[1,2].

The "point source" in this invention is an image of the output end of a 200 $\mu$m core diameter optical fiber being illuminated at its input end by focusing a laser beam. (Note: A diffuser plate called a phase randomizer that is present in the illuminator section of some microscopes uniformly distributes the arc- or lamp source image over the objective rear-focal-plane area. This plate must be removed when imaging magnetic WPOs.) This bright end-face of the fiber is imaged at the RFP and thereby produces an outgoing parallel ray bundle, providing nearly uniform illumination on the object plane[1]. Image distortion due to residual non-uniform background illumination may be diminished using A-to-D conversion, digital averaging[1-3], and subtraction from a reference image that contains only the background[1].

It is often necessary to integrate many video images to average noise and obtain suitable background subtraction. For this reason, systems for image processing should utilize frame memories having large pixel depth. Depths larger than the 6–8 bits of human eye gray-level response, are required. This large pixel depth enables summing single-frame images of minute WPO phase variations into image amplitudes and variations filling up higher level bits. Non-zero bits remaining after subtracting the higher level background image, are residuals in a lower bit-slice range. The bit-slice selection for the difference image may then be adjusted within the image processor so as to not address empty higher-level bits and to render an image from the low level bits and produce gray level contrast suitable to the viewer's eye. This image too can be stored in a digital frame memory.

It is desirable for increased efficiency to reduce the time typically consumed in completing the sequence of events for background subtraction and enhancement. Raising the intensity of the illumination will shorten this duration. Increasing intensity also produces images with greater effective resolution and helps reduce image deterioration during processing due to thermal/mechanical drifts in relative positions of microscope optics and stage. Mechanical drift as little as 0.1 micron during frame grabbing and image processing can reduce 'effective resolution' below the fundamental limit set by the wavelength of the light and the objective numerical aperture.

In order to decrease image processing time, the illumination source must not only be intense but steady. Video detectors with higher photo sensitivity would also help, but these tend to produce larger shot noise. A source of incoherent light that is considered to be the brightest, is the 100 W Hg-arc lamp. Arc illumination is unsteady however, in its amplitude, phase (polarization) and spatial distribution. Unsteadiness causes noise, requiring an additional time budget for averaging. Lasers can provide suitable steadiness and brightness. Laser use leads however, to image artifacts (noise and distortions) because of the coherence of the light that is detrimental to image quality and its interpretation. For example, images produced with laser illumination contain extraneous concentric rings due to interference of the incident wave front with spherical waves generated when plane-waves diffract off dust particles. Also, in the case of illumination through the objective lens (epi-illumination), bands of light and dark intensity are introduced into the image due to optical interference in the beam splitter.

We describe here a laser illuminator source that is intense, steady, and diminishes the image artifacts due to laser coherence; it has advantages over method's reported previously[5-7].

Preferred Embodiment

A suitable light intensity for the microscope is the CW Argon-ion laser, one capable of producing one or a few Watts of power. A pulsed laser such as an excimer laser may also be used. A water supply for cooling the laser and power supply, one that is stabilized against fluctuations in water pressure, may be useful to improve steadiness of the beam. Control of laser intensity with photo diode signals being fed back to the power supply (not shown), can also be beneficial. The feedback photo-sensor is best positioned downstream from the fiber output so as to stabilize the light intensity for illumination from within the microscope.

System & Procedure

Figure 6A:
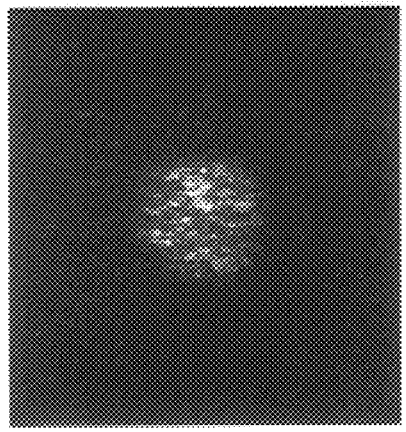
FIGS. 6(a–d) show images of the fiber face recorded for various different dithering means producing motions up to several mode spacings.

The illumination system in FIG. 5 conducts a 1–4 Watt light beam from a CW or pulsed laser 10 (short wavelength for best optical resolution) through a focusing lens 13 onto the input face 14 of a multi-mode fiber 50 which is held and manipulated with the aid of a fiber positioner (not shown). (A single-mode fiber made of quartz glass for blue light propagation and having a 3 micron core diameter for single mode propagation, produces a smaller optic field and has a lower threshold of damage than the multimode quartz fiber. The damage threshold for a 3 micron quartz fiber, is only 80 mW.) Light emanating from the preferred multimode fiber 50 (FIG. 5) is collected and directed into the microscope 55 by a wide-angle lens (e.g. a 35 mm camera lens) 53. Inside the microscope 55 the beam reflects off the beam splitter of an epi-illuminator (not shown) and forms an image of the fiber face 52 at the rear focal plane (RFP) of the objective lens. An image of the fiber face in the RFP may be viewed in the binocular of the microscope after inserting the Bertrand lens (a small adjustable telescope objective that flips into the body tube in front of the ocular and provides a means for inspecting the microscope's internal optics). Light rays from the fiber source pass through the objective and illuminate the object. This bright fiber output face thereby replaces the conventional source in the conventional microscope illumination scheme including conventional Koehler optics (the optical arrangement-not shown- for imaging the light source at the objective's rear focal plane). FIGS. 6(a–d), 8a and 11a are images of the fiber face recorded for various different dithering means that scramble the fiber modes and homogenize the output light. The illuminated object (visible with Bertrand lens removed) produces microscopic images [FIGS. 7(a–d), 8(b), 9, 10(a–b), 11(b), 12 and 13]. These patterns (images) are convolutions of the incident illumination pattern from the fiber and the object function. The fiber output image in FIG. 6(a), taken without applying any means of mode dithering, is a speckled pattern indicating that many modes are supported by the fiber. Approximately 104 modes are theoretically possible in a 100 micron diameter fiber. The object image in FIG. 7a corresponding to the modal fiber pattern FIG. 6a, is too mottled to be of use because the pattern contrast is much larger than that from many types of WPOs.

Figure 6B:
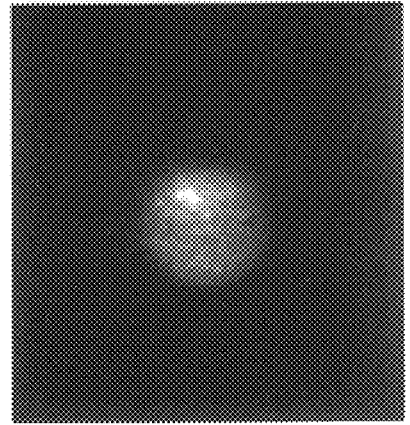
Figure 7A:
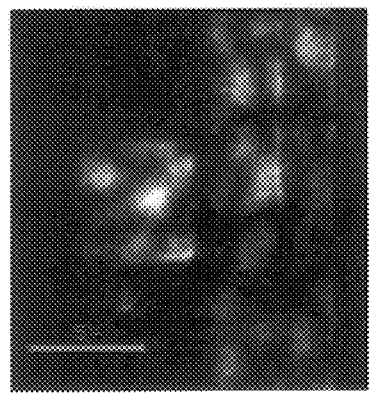
FIGS. 7(a–d) show object images corresponding to the various modal fiber patterns and dithering means recorded in FIG. 6.
Figure 7B:
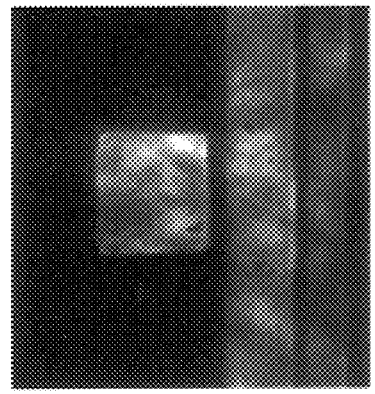

Method #1: The diffuser 20 is a spinning glass disk, which has a randomly undulated surface (unpolished Pyrex glass works well, for example). This surface produces a spatial phase variation across the width of the incident laser beam. Rotating the wedge 30 modulates the laser input to the fiber. A fiber coupling lens 13 conducts the modulated laser beam 12 into a spectrum of modes of the multi-mode fiber 50. The spinning wedge 30 acting on the laser light, scatters it into a larger number of fiber modes varying in time. This achieves a more uniform time-averaged output intensity distribution from the fiber than occurs when the wedge 30 is not present or not spinning. FIG. 6(b) shows the fiber mode distribution averaged over 64 video frames with Method #1 being applied. The corresponding illumination pattern on the object recorded in FIG. 7b, is improved over FIG. 7a, but is obviously yet unsatisfactory.

Figure 6C:
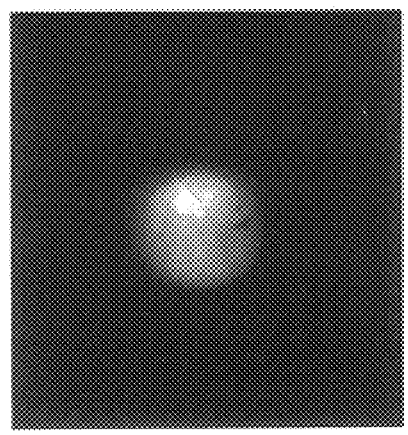
Figure 6D:
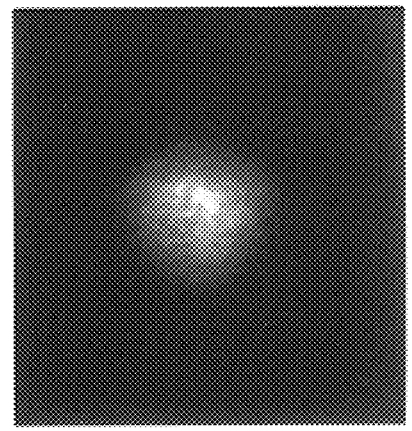
Figure 7C:
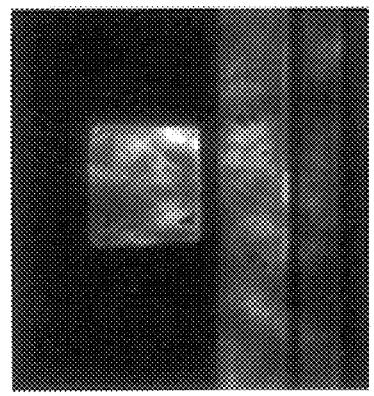
Figure 7D:

Method #2: Fiber modes can also be scrambled by mechanically vibrating or dithering some length of the fiber isolated from its ends. The dithering or homogenization was obtained by fastening several loops 54 of the fiber to a speaker cone 56 and applying an ac current. Results from applying this method which are shown in FIGS. 6c and 7c, were taken after optimizing frequency and amplitude of the speaker vibrations. This produced a somewhat smoother time-averaged fiber output (FIG. 6c) than Method #1 but only minor improvement in illumination uniformity at the recording head object (FIG. 7c). Method #3: An optical wedge 30 driven by a motor 32 is positioned in the beam after the fiber output coupling lens ahead of the microscope. Wedge 30 is constructed by starting with a flat circular disc having parallel faces, then angle-lapping one face to provide a continuous reduction in thickness, and finally polishing to an optical finish. Images shown in FIGS. 6d and 7d, were obtained using a disc made into a wedge having continuous reduction in thickness by 1 mm over its 10 cm disc diameter. A counter balancing weight 59 is applied at the thinnest edge to prevent vibration during spinning. The transmitted illumination beam is centered at an outer region near the disc perimeter.

Experimentally, the wedge 30 was first rotated about an axis at a small angle to the axis of the illumination, and then an axis parallel to the axis of microscope. Changes in wedge 30 position along the path between collector lens and microscope were also investigated. The latter has the greater influence on the RFP image of the fiber face, the object image and the modal pattern.

Figure 8A:
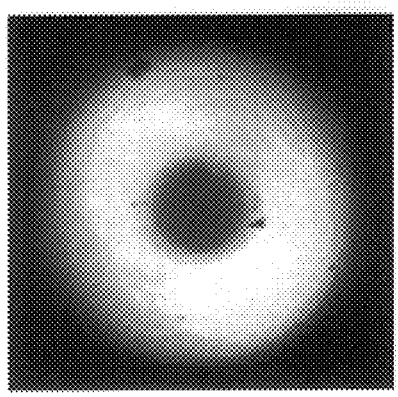
FIG. 8(a) shows an image of the fiber face recorded as a doughnut-shaped time average of circularly dithered motions larger than a face.
Figure 8B:
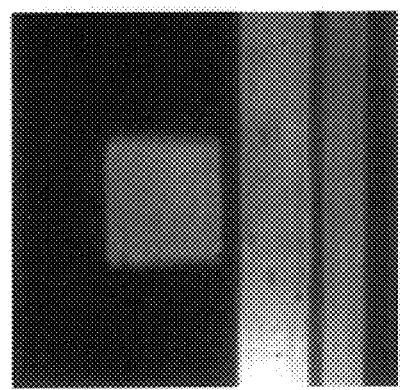
FIG. 8(b) shows an object image when a dithering-means axis of rotation is Misaligned with the optic axis by 30 degrees.
Figure 9:
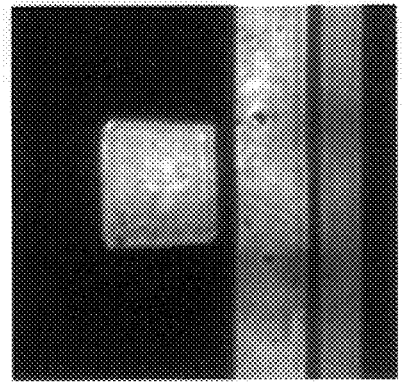
FIG. 9 shows an object image when a dithering-means axis of rotation is aligned Parallel to the optic axis.

In the parallel alignment case, wedge rotation causes the rear-focal-plane image of the fiber (the source) to move in a circular motion. When the wedge 30 is located close to the coupling lens, the time averaged motion is the doughnut shape recorded in FIG. 8(a). In the most preferred embodiment, the wedge 30 is located farther downstream from the collector lens. This position produces circular motions of smaller radius still visible in the objective RFP. A radius of motion only a few times the fiber's mode spacing instead of a few times the fiber diameter, is suitable for producing uniform illumination. Smaller motions position the instantaneous location of the fiber image closer to its average location. The specific location of the fiber in the RFP is important to the specific interpretation of Kerr signals in terms of the vector orientation of the magnetization in the magnetic sample or device In the case of wedge 30 rotation about an axis oblique to the optic axis (FIGS. 6(d) and 7(d), there occurs a larger amount of motion in- and out-of-focus in addition to rotation of the fiber face image. Experiments using a 30 degree tilt for the rotation axis of the wedge 30, showed the additional defocusing motion tends to diminish image focus (and resolution). This is exemplified by the fuzzy horizontal edges in FIG. 8b, whereas FIG. 9, which was recorded when the wedge 30 was rotated about an axis parallel to the optic axis, produces the sharpest focus and edge-definition.

Comparison with Conventional Hg-arc Illumination

Figure 10A:
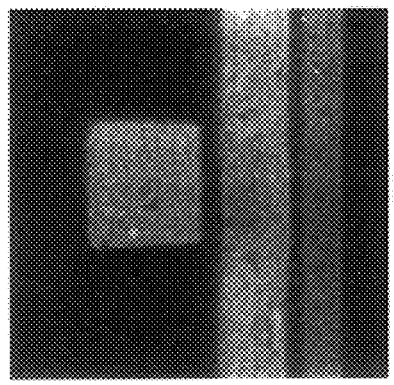
FIGS. 10(a–b) show object images comparing hg-arc and dithered laser Illumination.
Figure 10B:
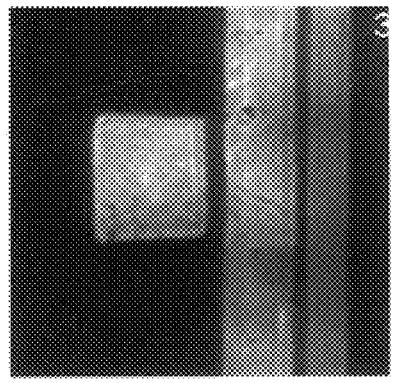

A comparison of conventional microscope illumination with laser/fiber illumination was made using mercury-arc illumination. FIGS. 10(a–b) were made using the 100 W Hg-arc, the most intense conventional source for optical microscopy. The single-frame image in FIG. 10a, representing the Hg-arc source, was obtained using the same microscope settings (magnification, polarizer offset angle, etc.) as for the laser illuminated images FIGS. 7(a–d). Striations in FIG. 10a are due to the discrete nature of the camera photocathode and the variability in pixel photosensitivity. This type of image nonuniformity occurs naturally when operating the camera at an illumination intensity near its threshold of photoresponse. In order to capture FIG. 10a in a single frame it was necessary to set camera gain at its maximum,—16 times higher gain than was required for the laser/fiber illumination 1–4 images of FIGS. 7 ((a–d) Striations shown in FIG. 10a are overcome in FIG. 10b taken when the gain was reduced slightly and a greater number of images accumulated—twice as many frames compared with the laser/fiber case of FIG. 7. It is clear that conventional light sources require greater image processing times to capture images of microscopic weak phase objects being magnified with polarized light microscopes than when more intense laser sources are used.

Combination Method

Figure 11A:
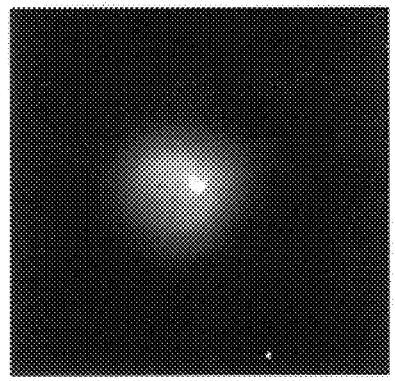
FIGS. 11(a–b) show an image of the dithered fiber face and the associated object image, respectively.
Figure 11B:
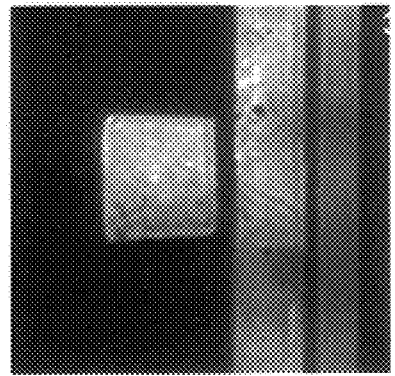
Figure 12:
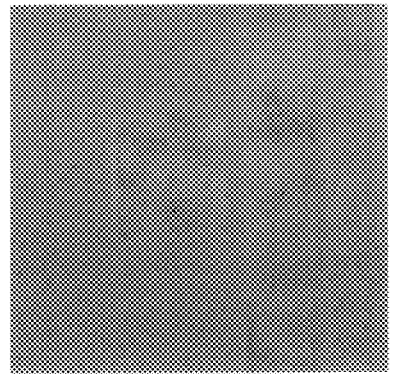
FIG. 12 shows an an image of the difference between two object images taken sequentially in time.

The results of applying all three methods of homogenization are exemplified in FIGS. 11a and 11b showing the fiber face image and the object image, respectively. The fiber image shown for slight oblique-axis rotation includes in- and out of focus motion as well as slight rotation of the fiber source. The object image (FIG. 11b was taken for the best case of parallel-axis rotation. This nearly uniform illumination result (except for the dust particles and linear marks caused by surface lapping of the device) occurs by combining all three fiber illumination methods for mode homogenization. Slight residual non uniform illumination is still present, however and can be caused by motions of any of the three means for dithering that are not synchronized with the video raster. This was investigated by applying two image-processing steps sequentially called Mottle Freeze and Mottle Subtract. Mottle Freeze averages 64 video frames and places the result in a frame memory. This is the method used to obtain the previous images and includes setting the bit-slice to 6–13. The Mottle Subtract function subtracts this image from all subsequent sequential images. Each difference image that follows sequentially in time, will contain zero bits if there is no change in the object and its illumination conditions. So, changes in background only that may occur can be imaged when no magnetic change is being applied to the sample. Recording them as images on a viewable (printable) scale of gray levels, requires applying a DC offset to each difference image. After the Mottle Freeze/Mottle Subtract functions are applied and stopped and the DC Offset is applied, the images as shown in FIG. 12 appear. The high brightness is due to an applied DC offset[10]. The residual contrast was so weak that it had to be amplified significantly. Amplification for FIG. 12 was produced by decreasing the bit-slice to the lowest level (0–5) which is well below the bit-slice 6–13 used in non subtracted images, FIGS. 6–11. The residual structure of FIG. 12, having barely any contrast at all, shows nearly ideal background suppression. This has resulted from combining all three Methods 1–3. This residual background from applying Methods 1–3 is weaker than occurs (but not shown here) with other forms of light source including 100 W Hg-arc and laser/fiber Methods 1–3 taken one- or two at a time.

The background effect exemplified in FIG. 12 can be extinguished completely by synchronizing all three forms of dithering to the video frame rate. The synchronization desired occurs when the frequencies of each method for dithering (disc rotation frequencies, speaker vibration frequency) are tuned to an integral number multiplied by the video frame rate (30 Hz). Indeed, residual contrast recorded in FIG. 12 did occur under slightly detuned conditions. The contrast residue is therefore due to the dithering method itself, as produced for example by spatially non-uniform or temporally non-periodic wedge 30 rotation or speaker vibration or piezo 50 vibration. This result means the mechanical quality of motors and piezos and optical properties of discs are important. The motors used here were supplied by manufacturers of lock-in amplifiers and are normally used to rotate light chopper blades so as to provide synchronized reference signals for phase sensitive lock-in techniques[11] applied to detection of weak electrical signals.

Tests on background effects over longer periods of time reveal difference images that may worsen with time. Such deterioration can occur due to thermal/mechanical drifts in the system. System drifts may include drifts in the laser (beam intensity and pointing), or relative movements in fiber positioner and laser, or in microscope and object stage. Sequential difference images like the one exemplified in FIGS. 7(a–d) are stable when system components of high quality are used. We use the Zeiss Axiomat polarizing microscope set up in the inverted mode because it affords rigidity and long term stability. Its mechanical axis of symmetry is colinear with its optic axis[12]; its inverted form offers four rigid posts for direct attachment of the object stage. The original stage supplied with the axiomat was replaced with a custom designed microscope stage attached rigidly to the four posts.) The laser component is a Coherent Innova 90 argon laser. We baffle the water supply against supply fluctuations in the water flow used to cool the laser and its power supply.

The nearly complete suppression of background effects (nonmagnetic, or non WPO related) we accomplish with this invention, enables magnetic response in magnetic devices to be imaged in real time (even devices composed.of magnetic materials such as permalloy that exhibit weak magneto-optic Kerr effects, and even mono-atomic layers of magnetic films of similar 3d atomic origin such as cobalt). Background suppression will also improve video imaging of other weak phase objects such as biological cells or latent images in lithographically exposed photo resist.

Polar Kerr-effect Contrast Image of Magnetic Device

Figure 13:
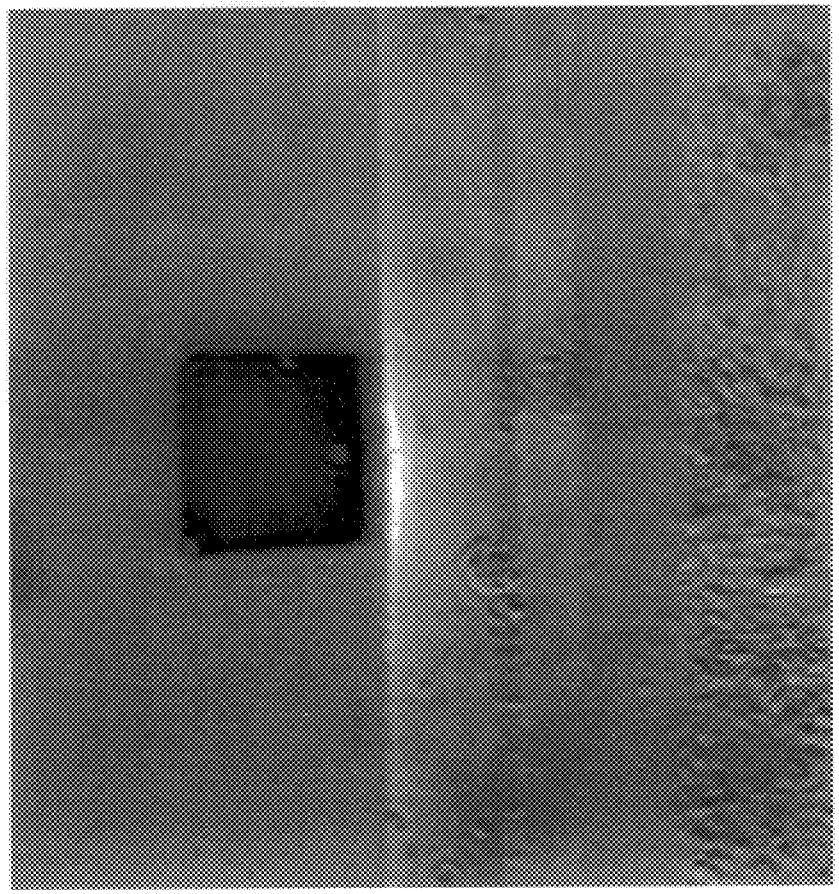
FIG. 13 shows an object image presenting magneto-optic polar Kerr contrast.

It isn't possible to demonstrate real-time imaging of weak phase objects in a paper draft. However, the overall quality of the invention is exemplified in its application to rendering an image of a magneto-optic feature as shown in FIG. 13. (This is taken on a recording head sample of the same design as imaged without magnetic contrast in FIGS. 6–12.) FIG. 13 shows polar Kerr contrast measuring distribution and strength of the magnetization produced when a dc current is applied to the head's integrated coil. Polar Kerr contrast which is generally produced when the focused source is centrally positioned in the objective RFP generally measures the perpendicular component of magnetization. Accumulations of 64 frames were obtained and stored in frame memory, one accumulation each for equal plus- and minus 80 mA dc currents applied to the recording head's integrated coil. Alternating the sign of the current alternates polarity of north and south poles at the pole tips. So, a double Kerr contrast image is produced when the two stored images are subtracted from each other. A DC offset is applied to the difference image to avoid negative bits and to match image intensity to a viewer's optimal eye response. The dark- and light levels of intensity in FIG. 13 show polarity and strength respectively, of the perpendicular magnetization component. A mid-gray level, arbitrarily set when the DC off-set level is set, represents zero perpendicular magnetization. This gray level permeates regions on non magnetic material lying outside the pole tips.

The optical resolution in this pole-tip imaged in FIG. 13 is remarkable. Compare the detail and sharpness at the edge of the non-magnetic gap against a scaling reference given by the square shaped pole tip 5×5 microns in area, and the nonmagnetic gap between the square tip and first wide tip known from the manufacturing process to be only 0.75 microns. The sharpness at the edges at the gap indicates the system and method of this invention are capable to provide an 'effective magneto-optical resolution' of 0.1 micron (100 nm) or below. (At least the "optical limit of perception" is that small.) A similar conclusion is made by inspection of normal images taken in reflection without magnetic contrast, FIGS. 7d and 9, for example. The edge roughness (scallops) is also real in the object; it too is resolved to this same level of resolution (or perception).

Further Embodiments

This disclosure also claims other conditions producing similar quality. These include use of:

(1) a prism illuminator in place of the half-silvered beam splitter for the Epi illuminator in the microscope;

(2) different types of lasers as light sources including: cw and pulsed diode lasers such as GaAs and GaN other III–V lasers; solid state lasers such as Nd-YAG and Alexandrite lasers and frequency doubled, tripled, and frequency converted solid state lasers, and pulsed gas lasers such as excimer lasers, especially excimer lasers having short wavelength such as XeCl, XeF, and ArF lasers, and fluorine lasers.

(3) translational motion of the RFP fiber image instead of rotational motion (retains pure linear polarization needed for more precise quantitative M-vector analysis);

(4) dithering of the end of the fiber perpendicular to the fiber axis instead of dithering the image of the fiber;

(5) other types of wide-field microscopes including transmission- in place of reflection-microscopes (negates use of epi-illuminator with beam splitter or prism) microscopes with achromatic mirror objectives and cartadioptric lenses (extension to uv or ir wavelength regions); and (6) other types of video cameras including CCD. Note: Both oil-immersion and non-immersion microscopy systems are options claimed for inclusion. Fiber optic cables may be selected for their maximum transmission at blue, green or red wavelength regions. Prism epi-illumination may be selected over half-silvered epi-illumination on the basis that the microscope would then produce four times greater illumination intensity at the sample object The prism may be replaced by a sliver-shaped front surface mirror partially blocking the lens aperture. Both prism and FS-mirror methods diminish however, the objective's numerical aperture and make the optical resolution asymmetric. The lens system the microscope may be reflective instead of refractive. Reflective (cartadioptric) lensing overcomes the optical opacity of glass (refractive) optics at deep ultraviolet wavelengths, and permits using shorter wavelength illumination for providing a higher optical resolution and depth of field. Refractive lensing using quartz and quartz-fluorite objectives may be used to produce parfocal observation in the ultraviolet and visible wavelength regions.

Alternative Methods

Alternate methods to scramble the image of the output face of the fiber include vibrating or rotating a mirror or lens (one being used to form the image), or vibrating a fiber face located physically (instead of optically) in the objective RFP. These methods differ in three respects from the case of the rotating wedge-shaped disc. The optical path length is not modulated. The intensity of illumination at the object is increased. However, the efficiency and adaptability of such methods to selective changes of a microscope's objective lenses are poor, because fiber or mirror positions would need to be reestablished following exchanges of objectives. This would be necessary in order for the fiber image to be compatible with the different objective lens's properties, e.g., location of each objective's RFP.

SUMMARY

A new illumination method for optical microscopy of weak phase objects (WPOs) is disclosed. It utilizes a laser beam coupled to a polarizing microscope through a multi-mode optical fiber. Single-mode optical fibers provide steady illumination, but their smaller diameter limits their laser power handling capability (<100 mW). The multi-mode fiber can carry the 1–5 Watts needed for wide-field illumination in the polarizing microscope without damaging its optical elements. In order to homogenize nonuniform time-varying illumination caused by fluctuating fiber modes, a unique method is applied. Without this method, the uneven pattern of illumination from multi-mode fibers destroys the weak contrast images of WPOs such as magnetic devices and biological cells that are developed when their phase distributions are converted to amplitude images using a polarizing optical microscope. The unique method to modulate and time-average image distortions caused by multi-mode fiber?s modal illumination results in illumination that is steadier (effectively) and brighter than conventional high intensity sources (for example, the 100 W Hg-arc lamp). Three dithering methods provided for homogenizing the light, are periodic in time. Therefore, the illumination variability caused by any or all three can be removed by simply synchronizing the dithering rate to an integer multiple of the video frame rate. This synchronization makes it possible to apply image processing with subtraction to remove essentially all background light, including that produced within the microscope itself. Thus, images and videos of WPO motions are attained which have high S/N ratios and wide dynamic range. Detection of these images may accomplished with non-intensified video cameras like the Chalnicon, the Newvicon, etc.

Advantages

Light intensity now becomes a variable for use in adjusting the microscope system, thereby placing less of the burden to match the response of the video Camera on the image processing functions. This variable enables optimizing Kerr contrast better than when polarizer/analyzer/compensator settings alone, are adjusted.

Images can be made at higher magnifications and better 'effective resolution' than is possible using conventional sources.

Intensity being constant in time and in amplitude (across the optic field) permits quantitative experiments measuring magnetization distributions. Magnetization-vector mapping is then obtainable in principle from combining two or three types of Kerr contrast, (polar, longitudinal and transverse).

Strengthened photometric signals resulting from increased intensity improve imaging and recording of localized magnetic responses, e.g. domain wall movements, Barkhausen jumps, domain structure instability, etc. in magnetic devices or materials.

Strengthened photometric signals also enable localized Kerr-effect hysteresis loops to be recorded with greater speed, dynamic range, and precision.

Similar advantages are incurred imaging other types of weak phase objects including the two described briefly above.

REFERENCES

1. B. E. Argyle, B. Petek and D. Herman, "Optical Imaging of Domains in Motion", JAP, Vol. 61, 4303 (1987).
2. B. E. Argyle, "A Magneto-optic Microscope System for Magnetic Domain Studies", Proc. Symposium on Magnetic Materials, Processes and Devices, 85–109, Vol 90–8, (1990), The Electrochemical Society, Inc. Pennington, N.J., Edited by L. T. Romankiw and D. A. Herman, Jr.
3. R. Schaefer, B. E. Argyle and P. L. Trouilloud, "Domain Studies in Single-Crystal Ferrite MiG Heads with Image-Enhanced, Wide-Field Microscopy", IEEE Trans. Magnetics, Vol.28, No.5, (September 1992).
4. S. Inoue, Video Microscopy, Plenum Press, New York, N.Y., 1986.
5. G. W. Ellis, "A Fiber-Optic Phase-Randomizer for Microscope Illumination by Laser", J. Cell Biol. 83, 303a (1979).
6. R. Hard, R. Zeh, and R. D. Allen, "Phase-Randomized Laser Illumination for Microscopy", J. Cell Sci. 23, 335 (1977).
7. M. J. Bowman, "Two New Methods for Improving Optical Image Quality", Appl. Opt. 7, 2280 (1968).
8. An adjustable source location is required for establishing specific magneto-optic sensitivities: polar Kerr-, transverse Kerr-, or longitudinal Kerr-effect sensitivity[1,2]. The longitudinal and transverse Kerr effect develops contrast among magnetic domains lying parallel to the object plane, while the polar Kerr effect contrasts perpendicular magnetic components. To produce the oblique and perpendicular illuminations appropriate for longitudinal and polar contrasts respectively, the output face of the fiber is simply translated within the objective RFP using an X,Y adjustable positioner. Placing the image of the fiber onto the optic axis yields polar-Kerr contrast, a sensitivity to only the component of magnetization which is perpendicular to the object surface. Anaxial positions produce longitudinal or transverse contrast depending on the orientation of the light polarization with respect to the illumination plane-of-incidence[1,2].
9. B. Petek, B. E. Argyle and D. A. Herman,"Reduction of coherence related noise in laser based imaging systems", IBM Technical Disclosure Bulletin, Vol. 37, No.12, December (1994), pp. 469–471.
10. (An offset supplied within the Hamamatsu C 1966 Processor as default value, was used)
11. Floyd M. Gardner, Phaselock Techniques, 2nd edition, John Wiley & Sons, 1979.
12. W. C. McCrone, "The New Zeiss Axiomat Microscope", The Microscope*, 21, No.3 July–October (1973), pp. 167–176. (*published by Microscope Publications Ltd., 2 McCrone Mews, Belsize lane, London, NW3 5BG, England.)
13.—IBM invention filed by B.Argyle, A. Halperin, M. Scaman and E. Yarmchuk as part of IBM Docket F19-98-012. Original disclosure F18-97-0620.
14. Cameras having a lower threshold of response, such as the silicon-intensified-target (SIT) camera, can also be used for low light level imaging. However, SIT cameras have a higher level of shot noise because they have lower quantum efficiency—only 10% compared with 99% for the Chalnicon camera. Shot noise will therefore occur in the images taken with a SIT camera unless additional processing time is consumed for increased image accumulation and averaging.

Obviously, many modifications and variations of the present invention are possible in light of the above teachings. It is therefore to be understood that, within the scope of the appended claims, the invention may be practiced otherwise then as specifically described.

We claim:

1. Apparatus for illuminating a field with a laser beam, comprising;
   a beam homogenizer, the beam homogenizer having an entrance aperture for receiving the laser beam and an exit aperture for emitting the homogenized laser beam;
   a lens means for imaging the exit aperture on to the field, and;
   a dither means for dithering the image of the exit aperture in a direction having a component parallel to the field.
2. The apparatus of claim 1, where the beam homogenizer is a light tunnel.
3. The apparatus of claim 1, where the beam homogenizer is a light pipe.
4. The apparatus of claim 1, where the beam homogenizer is an optical fiber.
5. The apparatus of claim 4, where the optical fiber suffers a time varying strain.
6. The apparatus of claim 4, where the exit aperture of the optical fiber is physically moved in a direction perpendicular to the optical axis of the optical fiber.
7. The apparatus of claim 1, where the dither means is a rotatable wedge placed between the exit aperture and the field.
8. The apparatus of claim 1, where the dither means is a electro-optic device.
9. The apparatus of claim 1, where the dither means is a magneto-optic device.
10. The apparatus of claim 1, where the dither means is an acousto-optic device.
11. The apparatus of claim 1, where the dither means is a rotatable lens section.
12. The apparatus of claim 1, where field is the rear focal plane of an optical microscope.
13. The apparatus of claim 1, where the lens means images the exit aperture on a lithographic mask in the field.
14. The apparatus of claim 12, further comprising an optical recording system for recording images of an object in the object plane of an optical microscope, and wherein the dither means is synchronized with the optical recording system.
15. A system for illuminating an object in an field, comprising;
   a laser for producing a laser beam;
   a beam homogenizer, the beam homogenizer having an entrance aperture for receiving the laser beam and an exit aperture for emitting the homogenized laser beam;

a lens means for imaging the exit aperture on to the field, and;

a means for dithering the image of the exit aperture in a direction having a component parallel to the field.

16. The system of claim 15, where the beam homogenizer is a light tunnel.

17. The system of claim 15, where the beam homogenizer is a light pipe.

18. The system of claim 15, where the beam homogenizer is an optical fiber.

19. The system of claim 18, where the optical fiber suffers a time varying strain.

20. The system of claim 15, where the dither means is a rotatable wedge.

21. The system of claim 15, where the dither means is a electro-optic device.

22. The system of claim 15, where the dither means is a magneto-optic device.

23. The system of claim 15, where the dither means is an acousto-optic device.

24. The system of claim 15, where the dither means is a rotatable lens section.

25. The system of claim 15, where the field is the rear focal plane (RFP) of an optical microscope, further comprising an optical microscope.

26. The system of claim 15, where the lens means images the exit aperture on a lithographic mask.

27. The system of claim 25 further comprising an optical recording system for recording images of an object in the object plane of the optical microscope, and wherein the dither means is synchronized with the optical recording system.

28. A method for illuminating a field, comprising;

directing a laser beam into the entrance aperture of a beam homogenizer;

imaging the exit aperture of the beam homogenizer on to the field, and;

dithering the image of the exit aperture in a direction having a component parallel to the field.

29. The method of claim 28, where the beam homogenizer is a light tunnel.

30. The method of claim 28, where the beam homogenizer is a light pipe.

31. The method of claim 28, where the beam homogenizer is an optical fiber.

32. The method of claim 31, where the optical fiber suffers a time varying strain.

33. The method of claim 28, where the dither means is a rotatable wedge.

34. The method of claim 28, where the dither means is a electro-optic device.

35. The method of claim 28, where the dither means is a magneto-optic device.

36. The method of claim 28, where the dither means is an acousto-optic device.

37. The method of claim 28, where the dither means is a rotatable lens section.

38. The method of claim 28, where the field is the rear focal plane of an optical microscope.

39. The method of claim 28, where the lens means images the exit aperture on a lithographic mask.

40. The method of claim 38, further comprising recording images of an object in the object plane of an optical microscope in synchronism with the dither of the image.

* * * * *